United States Patent [19]

Okumura et al.

[11] 4,438,741
[45] Mar. 27, 1984

[54] DEVICE FOR CONTROLLING A FLOW IN A HELICAL TYPE INTAKE PORT

[75] Inventors: Takeshi Okumura; Kiyoshi Nakanishi, both of Susono; Tokuta Inoue, Mishima, all of Japan

[73] Assignee: Toyota Jidosha Kogyo Kabushiki Kaisha, Toyota, Japan

[21] Appl. No.: 341,911

[22] Filed: Jan. 22, 1982

[30] Foreign Application Priority Data

Apr. 7, 1981 [JP] Japan .................................. 56-51149

[51] Int. Cl.³ .............................................. F02F 1/42
[52] U.S. Cl. .................. 123/188 M; 123/308
[58] Field of Search ................ 123/188 M, 308, 306, 123/432

[56] References Cited

U.S. PATENT DOCUMENTS

| | | | |
|---|---|---|---|
| 3,850,479 | 11/1974 | Boyhont et al. | 302/29 |
| 4,174,686 | 11/1979 | Shimizu et al. | 123/308 |
| 4,196,701 | 4/1981 | Tamura et al. | 123/188 M |
| 4,201,165 | 5/1980 | Tanaka et al. | 123/568 |
| 4,217,866 | 8/1980 | Nakajima | 123/308 |
| 4,253,432 | 3/1981 | Nohira et al. | 123/52 M |
| 4,257,384 | 3/1981 | Matsumoto | 123/575 |
| 4,262,639 | 4/1980 | Motosugi et al. | 123/188 M |
| 4,303,046 | 12/1981 | Nakanishi et al. | 123/308 |
| 4,312,309 | 1/1982 | Nakanishi et al. | 123/188 M |
| 4,318,273 | 3/1982 | Nohira et al. | 123/308 |

FOREIGN PATENT DOCUMENTS

| | | |
|---|---|---|
| 2059008 | 6/1972 | Fed. Rep. of Germany . |
| 2803533 | 8/1979 | Fed. Rep. of Germany . |
| 54-58129 | 5/1979 | Japan . |
| 56-54922 | 5/1981 | Japan . |
| 57-68519 | 4/1982 | Japan . |

*Primary Examiner*—Craig R. Feinberg
*Assistant Examiner*—W. R. Wolfe
*Attorney, Agent, or Firm*—Kenyon & Kenyon

[57] ABSTRACT

A helical type intake port is formed with the helical portion around an intake valve and the inlet portion tangentially contiguous to the helical portion.

A bypass passage is provided in a cylinder head, which is branched off from the inlet portion and connected to an end portion of said helical portion. The flow in the bypass passage is controlled by a valve in response to the amount of air in the intake port so that a strong swirl flow with a slight flow resistance may be obtained at not only a low revolution and a low load, but also at a high revolution and a high load.

13 Claims, 11 Drawing Figures

DEVICE FOR CONTROLLING A FLOW IN A HELICAL TYPE INTAKE PORT

BACKGROUND OF THE INVENTION

This invention relates to an internal combustion engine, especially to a device for controlling the flow in the helical type intake port.

It is well known that a helical type intake port is generally formed with the helical portion around an intake valve and the substantially straight inlet portion tangentially contiguous to the helical portion. When constructing the helical type intake port, the intake port must be formed in such a shape as to cause an increase of the flow resistance in order to get a strong swirl flow in the combustion chamber at a low revolution and low load, thus resulting in a decrease of the volumetric efficiency at a high revolution.

SUMMARY OF THE INVENTION

One object of the present invention is to provide a helical type intake port which not only ensures generation of a strong swirl flow in the combustion chamber at a low flow speed but can also provide a high volumetric efficiency at a high revolution and high load.

This and other objects can be attained by a device for controlling the flow in a helical type intake port in an internal combustion engine, said helical port being formed with the helical portion around an intake valve and the substantially straight inlet portion tangentially contiguous to the helical portion, said device comprising:

a bypass passage branched off from said inlet portion and connected to an end portion of said helical portion;

normally closed valve means arranged in said bypass passage for controlling the flow area of said bypass passage;

means for detecting the amount of air fed into a cylinder of the engine to produce a control signal indicating that the amount of air is increased beyond a predetermined value; and, actuating means for actuating said valve means in response to said control signal to open said valve means when the amount of air is increased beyond said predetermined value.

With this arrangement, the helical type intake port, according to the invention, is capable of ensuring a high volumetric efficiency with very slight flow resistance at not only a high revolution and high load, but also at a low revolution and low load.

The invention will now be described in more detail referring to the accompanying drawings which illustrate the preferred embodiments of the invention, in which.

DESCRIPTION OF PREFERRED EMBODIMENTS

Figure 1:
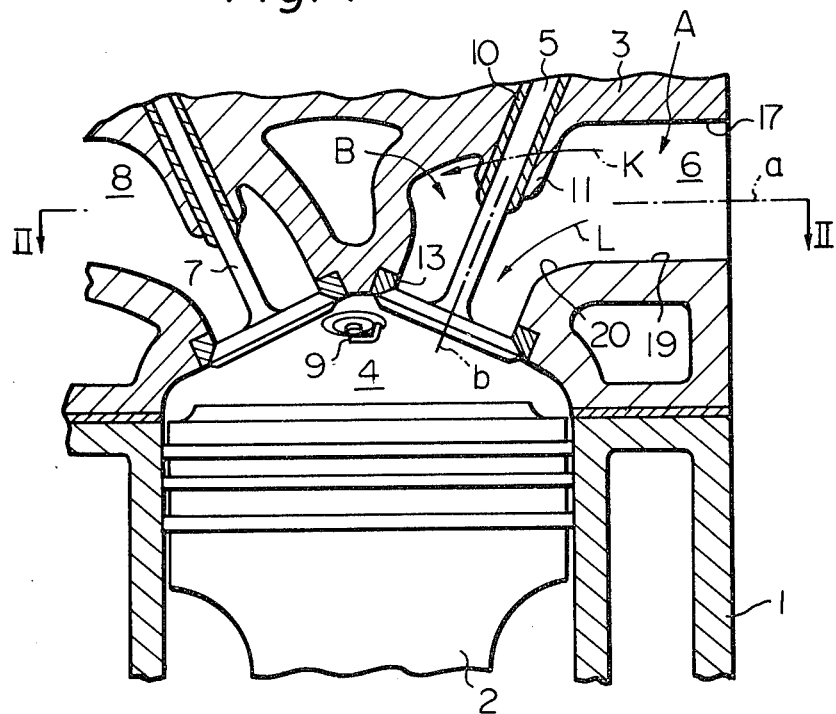
FIG. 1 is a sectional side view of an internal combustion engine provided with a helical type intake port according to the invention.
Figure 2:
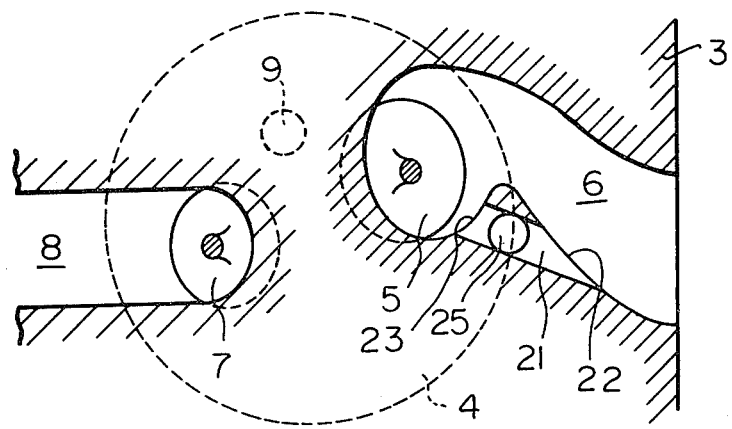
FIG. 2 is a section taken along line II—II in FIG. 1.

Referring now to FIGS. 1 and 2, numeral 1 designates a cylinder block, in which a piston 2 reciprocates. To the upper side of the cylinder block 1 a cylinder head 3 is provided. A combustion chamber 4 is formed between the piston 2 and the cylinder head 3. An intake valve 5, a helical type intake port 6, an exhaust valve 7, an exhaust port 8 and a spark plug 9 are arranged within the cylinder head 3. As can be seen in FIG. 1, a valve stem guide 10 is secured to a top wall of the helical type intake port 6 through a cylindrical projection 11 integral with the top wall, with the valve stem guide 10 projecting from the cylindrical projection 11 at the lower end thereof. Thus a mixture mixed in a carburetor (not shown) is introduced through the helical type intake port 6, and the intake valve 5 opens to allow the mixture to go into the combustion chamber 4 during the suction stroke, where the mixture is ignited by the spark plug 9 at the last period during the compression stroke.

Figure 3:
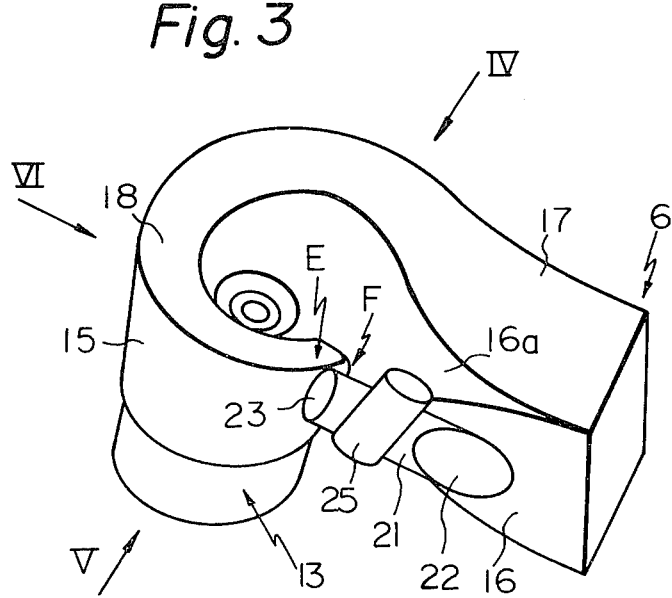
FIG. 3 is a perspective view illustrating a configuration of a helical type intake port in FIG. 1.
Figure 4:
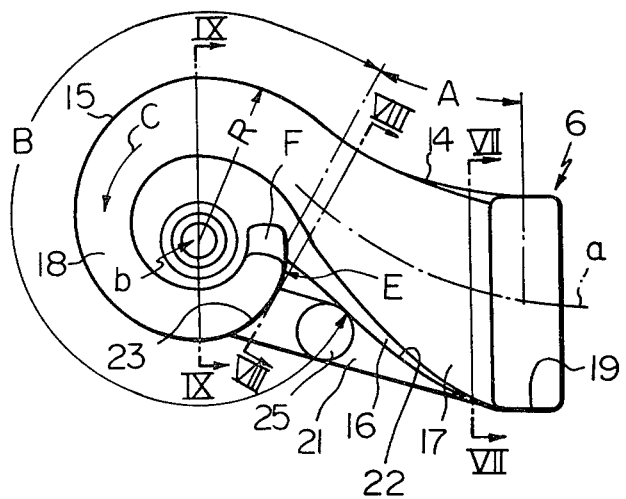
FIG. 4 is a side view of a helical type intake port taken along the arrow IV in FIG. 3.
Figure 6:
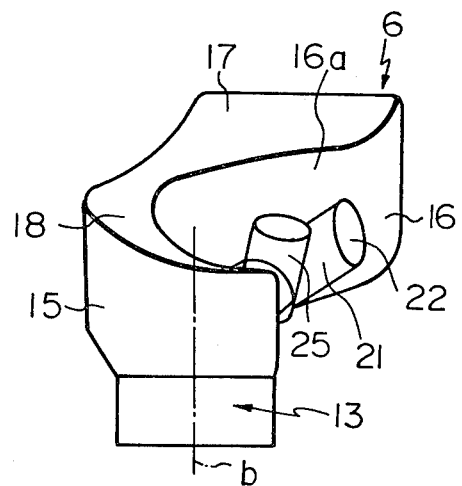
FIG. 6 is a section of a helical type intake port taken along the arrow VI in FIG. 3.
Figure 7:
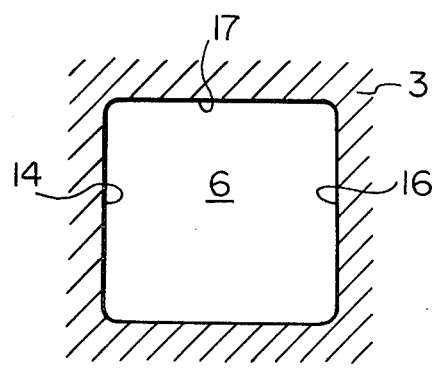
FIG. 7 is a section of an inlet portion taken along line VII—VII in FIG. 4.
Figure 9:
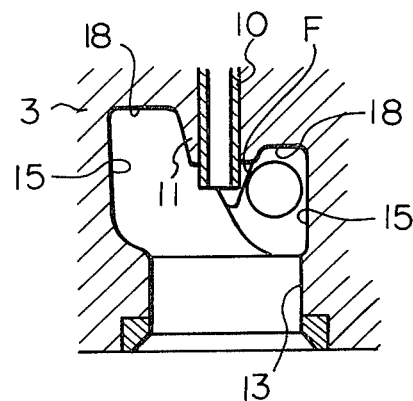
FIG. 9 is a section of a helical portion taken along line IX—IX in FIG. 4.

FIGS. 3 and 4 schematically show a configuration of the helical type intake port 6 in FIG. 1. The helical type intake port 6, as is clearly seen in FIG. 4, is formed with an inlet portion A, an axis of which is slightly bent, and a helical portion B. FIG. 7 shows a section of the inlet portion A at the opening end thereof, which seems to be almost rectangular, while a cylindrical mixture outlet 13 of the helical portion B (FIGS. 3 and 4) is shaped like a cylinder about an axis of the helical portion B. The axis b of the helical portion B, that is, the axis of the intake valve as seen in FIG. 1, is inclined toward an axis of the cylinder block, while the inlet portion A extends substantially horizontally. An outer side wall 14 of the inlet portion A, located remote from the axis of the helical portion B and substantially vertically arranged (FIGS. 3 and 4), is connected tangentially to an outer side wall 15 of the helical portion B. The outer side wall 15, as seen in FIGS. 6 and 9, projects from the cylindrical mixture outlet 13 in its outer configuration, and a distance R from the axis b of the helical portion B (FIG. 4) to an inner surface of the outer side wall 15 is almost constant at its initial position and decreases gradually along the helical portion by the arrow C, so that its end portion E may become substantially equal to the inner surface of the cylindrical mixture outlet 13.

Figure 8:
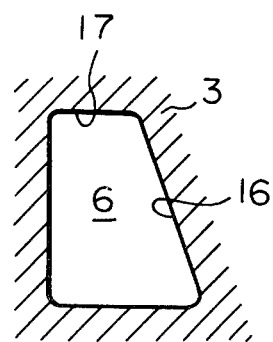
FIG. 8 is a section of an inlet portion taken along line VIII—VIII in FIG. 4.

An inner side wall 16 of the inlet portion A, nearer to the axis of the helical portion, has an upper portion 16a (FIG. 3) which is inclined downward, said inclined portion 16a getting wider toward the helical part B so that the whole side wall 16 may be inclined downward at its connecting position between the inlet portion A and the helical portion B, as seen in FIG. 8. At the connecting position, as shown in FIG. 4, an upper part of the side wall 16 is smoothly connected to a periphery of the cylindrical projection 11, while a lower part of the side wall 16 is connected to the end portion E of the outer side wall 15 of the helical portion B.

A top wall 17 of the inlet portion A, as seen in FIGS. 1 and 3, extends substantially horizontally from its opening end to the helical portion B, the top wall being connected to a top wall 18 of the helical portion B which is lowered gradually along the helical portion by arrow C and then is connected to the inclined side wall 16 of the inlet portion A. The width of the top wall 17 of the inlet portion A gets narrower toward the connecting position between the inlet portion A and the helical portion B, as hereinbefore described in which the inclined upper part 16a of the side wall 16 gets wider toward the helical portion, and the width of the top wall 18 of the helical portion B gets narrower along the helical portion B, as shown by arrow C as hereinbefore described in which the distance R is almost constant initially and decreases gradually along the helical portion B, as shown by arrow C. Therefore, the top wall 17 of the inlet portion A extends substantially horizontally but gets narrower toward the helical portion B, and subsequently, the top wall 18 of the helical portion B, connected smoothly to the former, becomes lower along the helical portion B, as shown by arrow C, and becomes narrower. The top wall 18, at last, is connected to an inclined wall F which is directed downward abruptly, as illustrated in FIGS. 3 and 4.

A bottom wall 19 of the inlet portion A, as seen in FIG. 1, extends substantially horizontally to the helical portion B, which is parallel to the top wall 17, and is connected to the cylindrical mixture outlet 13 through a curvilinear wall 20. The width of the bottom wall 19 gets narrower toward the helical portion B, as shown in FIG. 4.

Figure 5:
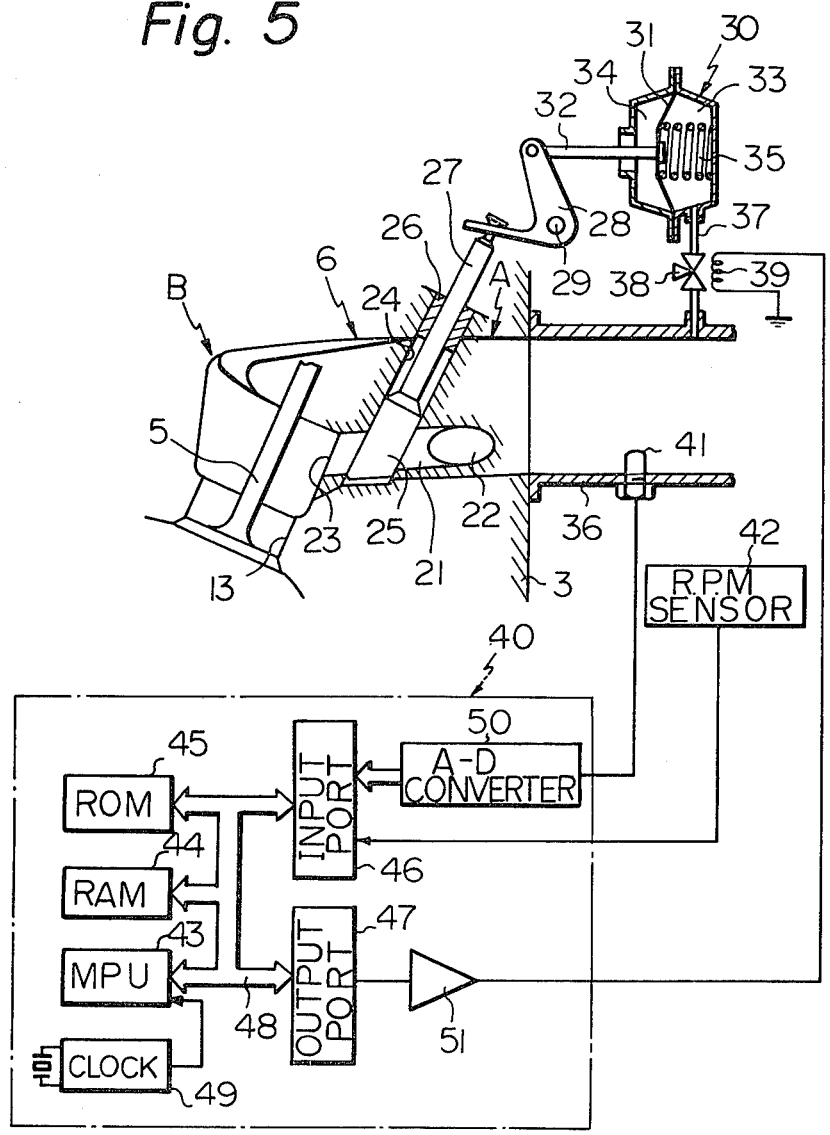
FIG. 5 is a schematic view of a device for controlling the flow in a helical type intake port, according to the invention, taken along the arrow V in FIG. 3.

Now referring to FIGS. 2 through 6, according to the invention, there is provided a bypass passage 21 in the cylinder head 3, which is branched from the inlet portion A and connected to the end portion E of the helical portion B. An inlet opening 22 of the bypass passage 21 is formed in the side wall 16 near to the inlet opening of the inlet portion A, and an outlet opening 23 of the bypass passage 21 is formed in the upper part of the outer side wall 15 of the helical portion B. Preferably, the cross-sectional area of the bypass passage 21 is 0.3 times larger than that of the smallest part of the intake port. As seen in FIG. 5, there is provided a cylindrical bore 24 crossing the bypass passage 21, in which a valve 25 is slidably inserted. The cylindrical bore 24 is provided with a guide sleeve 26, through which a valve rod 27 (on which the valve 25 is located) extends. A lever 28 is mounted rotatably on the cylinder head 3 by a pivot 29. One end of the lever 28 is connected to the upper end of the valve rod 27, and the other end is connected to a diaphragm 31 of a vacuum diaphragm apparatus 30 through a control rod 32. The vacuum diaphragm apparatus 30 consists of a vacuum chamber 33 and an atmospheric pressure chamber 34 separated by the diaphragm 31, and a compression spring is arranged in the vacuum chamber 33.

The intake port 6 is connected to an intake pipe 36 which is connected to a carburetor (not shown). According to the invention, the intake pipe 36 has a bore for communicating with the vacuum chamber 33 of the vacuum diaphragm apparatus 30 through a conduit 37 which has an electro-magnetic valve 38 interposed therebetween, a solenoid 39 of the electro-magnetic valve being connected to an electronic control unit 40. Further, a sensor 41, for sensing the level of the vacuum in the intake pipe 36, is provided on the intake pipe 36, the sensor 41 being connected to the electronic control unit 40. In addition, a sensor 42, for detecting crank shaft revolutions, is provided and connected to the electronic control unit 40.

The electronic control unit 40 comprises a digital computer which includes a microprocessor (MPU) 43 for executing the arithmetic and logic processing, a random-access memory (RAM) 44, a read-only memory (ROM) 45 having a control program and arithmetic constants etc., and an input port 46 and an output port 47 being connected with the MPU 43, the RAM 44, and the ROM 45 through a bidirectional bus 48. The electronic control unit 40 also includes a clock generator 49 for generating various clock signals. The vacuum sensor 41 is connected to the input port 46 through an A-D converter, and the revolution sensor 42 is directly connected to the input port 46. The vacuum sensor 41 generates an output voltage proportional to the level of the vacuum in the intake pipe 36, and the output voltage is converted into a corresponding binary coded signal which is input to the MPU 43 through the input port 46 and the bidirectional bus 48. The revolution sensor 42 generates pulses according to each predetermined angle of the revolution of the crank shaft, said pulses being input to the MPU 43 through the input port 46 and the bidirectional bus 48. The output port 47 is connected to the solenoid 39 of the electro-magnetic valve 38 through a power amplifier 51.

Figure 10:
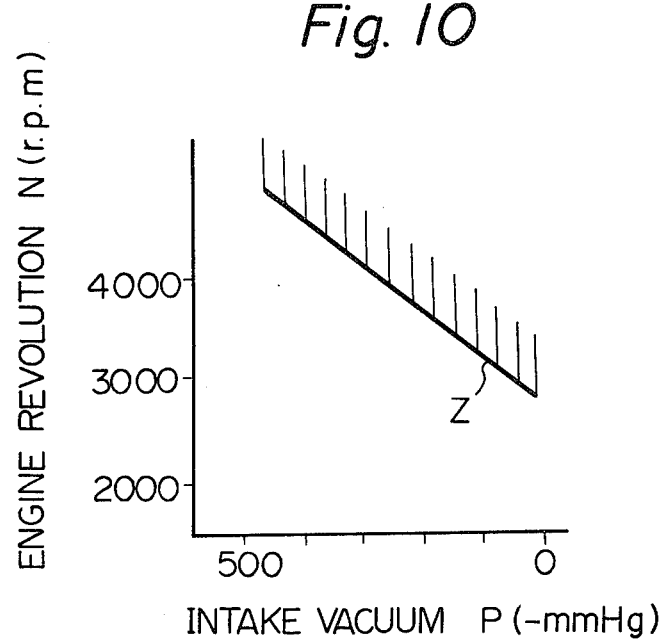
FIG. 10 is a graph illustrating the opening range of a valve relative to the intake pressure and the revolutions of an engine.

FIG. 10 shows a graph of the relationship between the revolutions N (r.p.m) of the engine and vacuum P (-mm HG) in the intake pipe 36, which actuate the electromagnetic valve 38. In FIG. 10, the line Z shows the critical boundary for actuating the electromagnetic valve 38, and the upper hatched region above the line Z shows that the electromagnetic valve 38 is actuated. The relationship Z between the engine revolutions N and the vacuum P is input initially in the ROM 45 as a function or a data table. The MPU 43 calculates an engine revolution N based on an output signal of the revolution sensor 42. Then the calculated revolution N and the vacuum P, received from the output signal of the vacuum sensor 41 through the A-D converter 50, are compared to the function Z stored in the ROM 45, so that when the revolution N and the vacuum P are in the upper region of the function Z, the MPU 43 causes the output port 47 to generate an actuating signal for the electromagnetic valve 38. Thus, the solenoid 39 is excited so that the vacuum chamber 33 is communicated with the intake pipe 36 by the electromagnetic valve 38, resulting in a vacuum being introduced in the vacuum chamber 33. Thereby, the diaphragm 31 moves to the right, according to FIG. 5, against the spring 35, which causes the lever 28 to pivot in the clockwise direction lifting the valve 25 upwards, and the bypass passage 21 is opened. When the engine revolution N and the vacuum P are out of the hatched region in FIG. 10, the solenoid is not excited so that the vacuum chamber 33 is communicated with the atmosphere by the electromagnetic valve 38. Therefore, the diaphragm 31 moves to the left by the effect of the spring 35, resulting in the valve 25 closing the bypass passage 21. It is to be noted that the upper hatched region in FIG. 10 shows the region where the amount of the air being sucked is large, therefore, the valve 25 opens when the amount of the air fed is large and it closes when the amount of the air fed is small.

According to the above description, the valve 25 shuts the bypass passage 21 at a low engine revolution and a low load. In this state, a part of the mixture fed into the inlet portion A moves forward along the top walls 17 and 18 in the direction of arrow K, according to FIG. 1, and the remainder moves forward against the inclined side wall 16a and is caused to change its course in the downward direction and flows, without swirling, into the cylindrical mixture outlet 13 along arrow L in FIG. 1. Since the width of the top walls gets narrower, the passage of the mixture gets narrower, and also since the top wall 18 becomes lower along the helical C, the flow along the top walls 17 and 18 gradually becomes accelerated as it becomes lower. Thus, the flow becomes a swirl flow in the helical part B, which causes the remainder of the flow, shown by arrow L, flowing into the cylindrical mixture outlet 13 to swirl. Subsequently, a strong swirling flow is generated around the helical axis b in the cylindrical mixture outlet 13, so that the swirling flow swirls along the inner wall of the cylindrical outlet smoothly, with very slight flow resistance. The swirling flow is introduced into the combustion chamber through a gap between the intake valve 5 and its valve seat, so that a strong swirling flow is generated in the combustion chamber.

On the other hand, the valve 25 opens the bypass passage 21 at a high engine revolution and a high load, so that a part of the mixture fed into the inlet portion A is introduced into the helical portion B through the bypass passage 21, with a very slight flow resistance. Since another part of the mixture which moves forward along the top wall 18 of the helical portion B becomes lower abruptly at the inclined wall F of the helical end portion E, a high vacuum is realized at the end portion E, that is, at the outlet opening 23 of the bypass passage 21. Thus, because of the pressure difference between the inlet portion A and the helical end portion E, a large amount of the sucked mixture is introduced into the helical portion B through the bypass passage 21 when the valve 25 opens. It is appreciated that a high volumetric efficiency is ensured in the intake port according to the invention, because not only is the whole flow area increased, but also a large amount of the sucked mixture is introduced into the helical portion B through the bypass passage 21, with a very slight flow resistance, when the valve 25 is opened. It is also appreciated that a part of the mixture which moves forward against the inclined side wall 16a is introduced into the cylindrical mixture outlet 13 along the smooth curved wall 20 without swirling, similar to a flow in a conventional intake port; thus, the flow resistance is decreased and the volumetric efficiency is increased at a high engine revolution and a high load.

Figure 11:
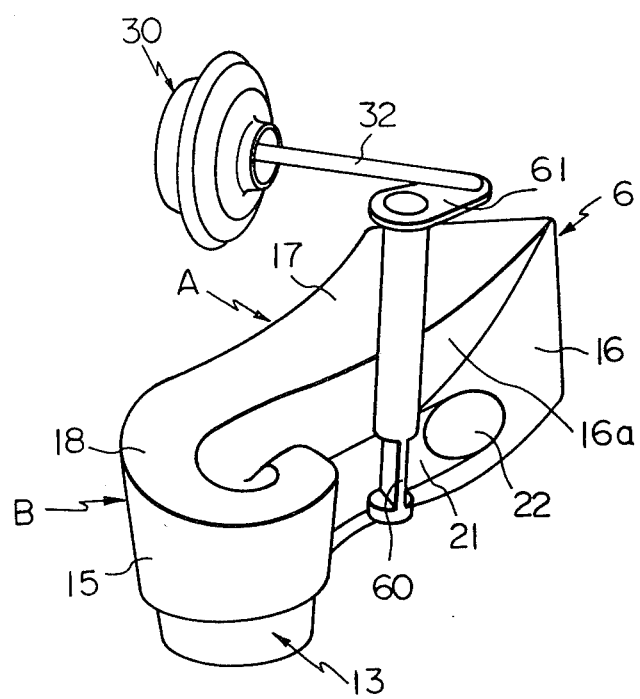
FIG. 11 is a perspective view of another embodiment of a device for controlling the flow in a helical type intake port according to the invention.

Another preferred embodiment is illustrated in FIG. 11. There is provided a rotary plate valve 60 in the bypass passage 21, which is controlled by the vacuum diaphragm apparatus 30 through an arm 61 connected to the upper end thereof and a control rod 32 connected therebetween. Thus, by rotating the valve 60 about its axis, the flow in the bypass passage 21 is able to be controlled.

We claim:

1. A device for controlling the flow in a helical type intake port in an internal combustion engine having a cylinder block containing a cylinder and a cylinder head containing an intake valve and an exhaust valve for the cylinder, said helical port being formed in said cylinder head with a helical portion around said intake valve and a substantially straight inlet portion tangentially contiguous to the helical portion, said device comprising:

a bypass passage branched off from said inlet portion and connected to an end portion of said helical portion, said bypass passage being formed completely within said cylinder head;

normally closed valve means arranged in said bypass passage for controlling the flow area of said bypass passage;

means for detecting the amount of air fed into a cylinder of the engine to produce a control signal indicating that the amount of air is increased beyond a predetermined value; and actuating measn for actuating said valve means in response to said control signal to open said valve means when the amount of air is increased beyond said predetermined value.

2. A device accordng to claim 1, wherein said bypass passage is connected to said end portion of said helical portion near a top wall of said helical portion.

3. A device according to claim 1, wherein the bypass passage is substantially straight.

4. A device according to claim 1, wherein said inlet portion comprises an inner side wall located near the intake valve, an outer side wall located remote from the intake valve, a top wall and a bottom wall, said inner side wall being inclined such that the width of said top wall is narrower than that of said bottom wall, with said outer side wall extending substantially vertically.

5. A device according to claim 4, wherein said inner side wall comprises a vertical portion located remote from the intake valve and a downwardly inclined portion located near the intake valve, said inclined portion being smoothly connected to a periphery of a cylindrical projection of a valve stem and said bypass passage being branched off from said vertical portion.

6. A device according to claim 1, wherein said valve means comprises a valve inserted into a cylindrical bore which is arranged across the bypass passage.

7. A device according to claim 6, wherein said valve is a slide type valve.

8. A device according to claim 6, wherein said valve is a rotary valve.

9. A device according to claim 1, wherein said detecting means comprises a first sensor for detecting the level of vacuum in the intake port and a second sensor for detecting the revolution of the engine, and said actuating means is operated in response to the control signals of said first and second sensors.

10. A device according to claim 9, wherein said actuating means comprises a diaphragm apparatus having a vacuum chamber connected to a vacuum source.

11. A device according to claim 10, wherein said vacuum chamber communicates to the vacuum source or to an atmospheric pressure.

12. A device according to claim 11, wherein said vacuum source is the vacuum in the intake port, said vacuum chamber being connected to the intake port through a piping.

13. A device according to claim 12, wherein an electro-magnetic valve is arranged in said piping.

* * * * *